United States Patent
Han et al.

(10) Patent No.: US 7,529,206 B2
(45) Date of Patent: *May 5, 2009

(54) METHOD AND SYSTEM FOR NOTIFYING 1XEV-DO SYSTEM OF SWITCHING FROM 1XEV-DO SYSTEM TO 1X SYSTEM

(75) Inventors: Changmoon Han, Seoul (KR); Jonghyun Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 236 days.

This patent is subject to a terminal disclaimer.

(21) Appl. No.: 10/541,253

(22) PCT Filed: Dec. 12, 2003

(86) PCT No.: PCT/KR03/02721

§ 371 (c)(1),
(2), (4) Date: Jun. 16, 2006

(87) PCT Pub. No.: WO2004/059998

PCT Pub. Date: Jul. 15, 2004

(65) Prior Publication Data

US 2006/0239227 A1 Oct. 26, 2006

(30) Foreign Application Priority Data

Dec. 30, 2002 (KR) ............... 10-2002-0087432
Aug. 4, 2003 (KR) ............... 10-2003-0053897

(51) Int. Cl.
*H04Q 7/00* (2006.01)
(52) U.S. Cl. ............... 370/331; 370/328; 370/355
(58) Field of Classification Search ............... None
See application file for complete search history.

(56) References Cited

U.S. PATENT DOCUMENTS 5,377,185 A * 12/1994 Bardusk ............... 370/341
5,711,006 A * 1/1998 Brochu et al. ............... 455/445
6,125,283 A * 9/2000 Kolev et al. ............... 455/552.1
6,842,619 B2 * 1/2005 Lee et al. ............... 455/453

FOREIGN PATENT DOCUMENTS

| CN | 1386028 | 12/2002 |
| JP | 2002-345019 | 11/2002 |
| WO | WO-02/47427 A2 | 6/2002 |

* cited by examiner

*Primary Examiner*—Dwayne D Bost
*Assistant Examiner*—Sayed T Zewari
(74) *Attorney, Agent, or Firm*—Lowe Hauptman Ham & Berner, LLP

(57) ABSTRACT

The present invention comprises: a hybrid access terminal, operating in both a 1X mode for being provided with a low-rate data transmission service from a 1X system and a 1xEV-DO mode for being provided with a high-rate data transmission service from a 1xEV-Do system, periodically switching over to the 1X system while in traffic with the 1xEV-DO system, for transmitting a notice signal for advising the switching over a base station transceiver subsystem including 1xEV-DO transceiver subsystem for exchanging a packet data with the hybrid access terminal and a 1X transceiver subsystem for exchanging a voice or data with the hybrid access terminal and a base station controller including a 1xEV-DO controller for controlling a packet data transmission service, of the 1xEV-DO transceiver subsystem and a 1X controller for controlling transmission service of the 1X transceiver subsystem.

23 Claims, 5 Drawing Sheets

METHOD AND SYSTEM FOR NOTIFYING 1XEV-DO SYSTEM OF SWITCHING FROM 1XEV-DO SYSTEM TO 1X SYSTEM

FIELD OF THE INVENTION

The present invention relates to a method and a system for notifying a 1xEV-DO system of switching from a 1xEV-DO mode to a 1X mode when a hybrid access terminal (HAT) is switched from the 1xEV-DO mode into the 1X mode, and more particularly to a method and a system capable of creating a signal notifying a 1xEV-DO system of switching from a 1xEV-DO mode to a 1X mode and transmitting the signal to the 1xEV-DO system by loading the signal in a predetermined channel of a reverse link when a hybrid access terminal in traffic with the 1xEV-DO system is switched into the 1X mode in order to search the 1X system.

DESCRIPTION OF THE PRIOR ART

Mobile communication systems have been greatly advanced through $1^{st}$ generation analog-type advanced mobile phone systems (AMPS) and $2^{nd}$ generation cellular/personal communication service (PCS) systems. Recently, international mobile telecommunication-2000 (IMT-2000) systems have been developed and are widely used as $3^{rd}$ generation high-rate data communication systems.

The 3GPP2 ($3^{rd}$ Generation Partnership Project2), which is a collaborative international standardization group, offers standards of a CDMA IMT-2000 system as IMT-2000 standards in order to provide multimedia mobile communication services. According to the above standards, a high rate packet data system called "1xEV(evolution)" based on an HDR (high data rate) proposed by Qualcom Incorporated, has been decided upon as an international standard high rate packet data system. A CDMA 2000 1xEV-DO (data optimized or data only) system has been upgraded from a CDMA 2000 1X system and is designed to transmit only data.

In the following description, the CDMA 2000 1X system is simply referred to as "1X system" and the CDMA 2000 1xEV-DO system is simply referred to as "1xEV-DO system" for the convenience of explanation.

The 1X system utilizes both circuit networks and packet networks and provides high-rate data services with a maximum transmission rate of 307.2 Kbps. In contrast, the 1xEV-DO system is dedicated for packet data and provides high-rate packet data services with a maximum transmission rate of 2.4 Mbps.

Currently, the 1xEV-DO system has been used together with the conventional 1X system. That is, both of the 1xEV-DO system and the conventional 1X system are installed in one wireless base station or a base station controller even though they are operated separately from each other. In other words, a transceiver of the wireless base station includes a channel card for the 1xEV-DO system and a channel card for the 1X system, respectively. In addition, the base station controller includes a data processing board for processing packet data transmitted from the 1xEV-DO system and a data processing board for processing data transmitted from the 1X system, respectively.

High-rate data are transmitted to a mobile communication terminal from a mobile communication system, such as the wireless base station or the base station controller, through the 1xEV-DO system. In addition, voice signals or low-rate data are transmitted to the communication terminal through the 1X system.

A hybrid access terminal capable of receiving communication services transmitted from the mobile communication system having both 1xEV-DO system and 1X system may periodically monitor each of the 1xEV-DO and 1X systems in a predetermined period of time. That is, the hybrid access terminal periodically and alternately searches the 1xEV-DO and 1X systems in an idle mode thereof and periodically searches the 1X system when the hybrid access terminal is in traffic with the 1xEV-DO system.

Particularly, the hybrid access terminal in traffic with the 1xEV-DO system periodically accesses to the 1X system and updates system resources, such as system messages and access messages, in order to respond to low-data call signals, such as voice call-accepted signals and short messages, which may be transmitted to the hybrid access terminal from the 1X system.

However, the hybrid access terminal must stay in the 1X system until the system resources have been completely updated whenever the hybrid access terminal periodically accesses to the 1X system even if the hybrid access terminal is in traffic with the 1xEV-DO system.

In addition, the 1xEV-DO system may perform a call drop operation if the 1xEV-DO system does not receive a signal from the hybrid access terminal within a predetermined period of time (for example, 5.12 seconds) when the hybrid access terminal is in traffic with the 1xEV-DO system. That is, regardless of reasons thereof, if the 1xEV-DO system detects no signal from the hybrid access terminal within the predetermined period of time, the 1xEV-DO system performs the call drop operation with respect to the hybrid access terminal in order to efficiently utilize the system resources.

However, currently used 1xEV-DO systems have structures which do not provide a user with reasons for the call drop operation. In other words, the 1xEV-DO system does not provide the user with information allowing the user to find a precise reason for the call drop operation, even though the call drop operation may happen in various situations, such as when the hybrid access terminal making a call-connection with the 1xEV-DO system is shifted into a wave shadow zone, when a communication system malfunctions, or when the hybrid access terminal is switched into the 1X system.

SUMMARY OF THE INVNETION

Therefore, the present invention has been made in view of the above-mentioned problems, and it is an object of the present invention to provide a method and a system capable of creating a signal notifying a 1xEV-DO system of switching from a 1xEV-DO mode to a 1X mode and transmitting the signal to the 1xEV-DO system by loading the signal in a predetermined channel of a reverse link when a hybrid access terminal in traffic with the 1xEV-DO system is switched into the 1X mode in order to search the 1X system.

In order to accomplish the above object, according to a first aspect of the present invention, there is provided a system for notifying a CDMA 2000 1xEV-DO system of switching from a 1xEV-DO mode into a 1X mode when a hybrid access terminal is switched into the 1X mode, the system comprising: a hybrid access terminal operated in relation to a 1X system and the 1xEV-DO system, the hybrid access terminal in traffic with the 1xEV-DO system being periodically switched into the 1X mode in order to search the 1X system while transmitting a predetermined signal notifying the 1xEV-DO system of switching of the hybrid access terminal from the 1xEV-DO mode into the 1X mode if the hybrid access terminal is switched into the 1X mode; a base station transceiver subsystem including a 1xEV-DO access network transceiver for transmitting/receiving packet data to/from the hybrid access terminal and a 1X transceiver for transmitting/receiving voice or data to/from the hybrid access terminal; a base station controller including a 1xEV-DO access network controller for controlling a packet data transmission service of the 1xEV-DO access network transceiver and a 1X controller for controlling a transmission service of the 1X transceiver; and a packet data serving node (PDSN) connected to the 1xEV-DO access network controller so as to transmit/receive the packet data to/from the 1xEV-DO system.

According to a second aspect of the present invention, there is provided a method for notifying a CDMA 2000 1xEV-DO system of switching from a 1xEV-DO mode into a 1X mode when a hybrid access terminal is switched into the 1X mode, the method comprising the steps of: (a) sequentially initializing the 1X mode and the 1xEV-DO mode of the hybrid access terminal such that the hybrid access terminal stays in an idle state; (b) dual monitoring the 1X mode and the 1xEV-DO mode by using the hybrid access terminal in a state that the hybrid access terminal stays in the idle state; (c) transmitting/receiving packet data by forming a connection and a session when the hybrid access terminal enters into a traffic state of the 1xEV-DO mode; (d) switching the hybrid access terminal into the 1X mode after transmitting a predetermined signal to the 1xEV-DO system when a predetermined monitoring time lapses; and (e) determining that the hybrid access terminal is switched into the 1X mode through demodulating the predetermined signal received in the 1xEV-DO system.

According to a third aspect of the present invention, there is provided a hybrid access terminal capable of preventing a call drop thereof with respect to a 1xEV-DO system by notifying the 1xEV-DO system of switching of the hybrid access terminal from a 1xEV-DO mode into a 1X mode, the hybrid access terminal comprising: a timer repeatedly measuring a monitoring time in order to perform dual monitoring between the 1xEV-DO system and a 1X system; a searcher module for tracking and converting frequency so as to detect the switching of the hybrid access terminal between the 1X mode and the 1xEV-DO mode, and receiving an overhead message; a finger module for demodulating the overhead message received in the searcher module; and a mobile station modem (MSM) chip alternately and periodically searching the 1xEV-DO system and the 1X system, creating a predetermined signal notifying the switching of the hybrid access terminal from the 1xEV-DO mode into the 1X mode when the hybrid access terminal is switched into the 1X mode, and transmitting the predetermined signal to the 1xEV-DO system through the searcher module.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Reference will now be made in detail to the preferred embodiments of the present invention.

In the following description of the present invention, a detailed description of known functions and configurations incorporated herein will be omitted when it may make the subject matter of the present invention rather unclear.

Figure 1:
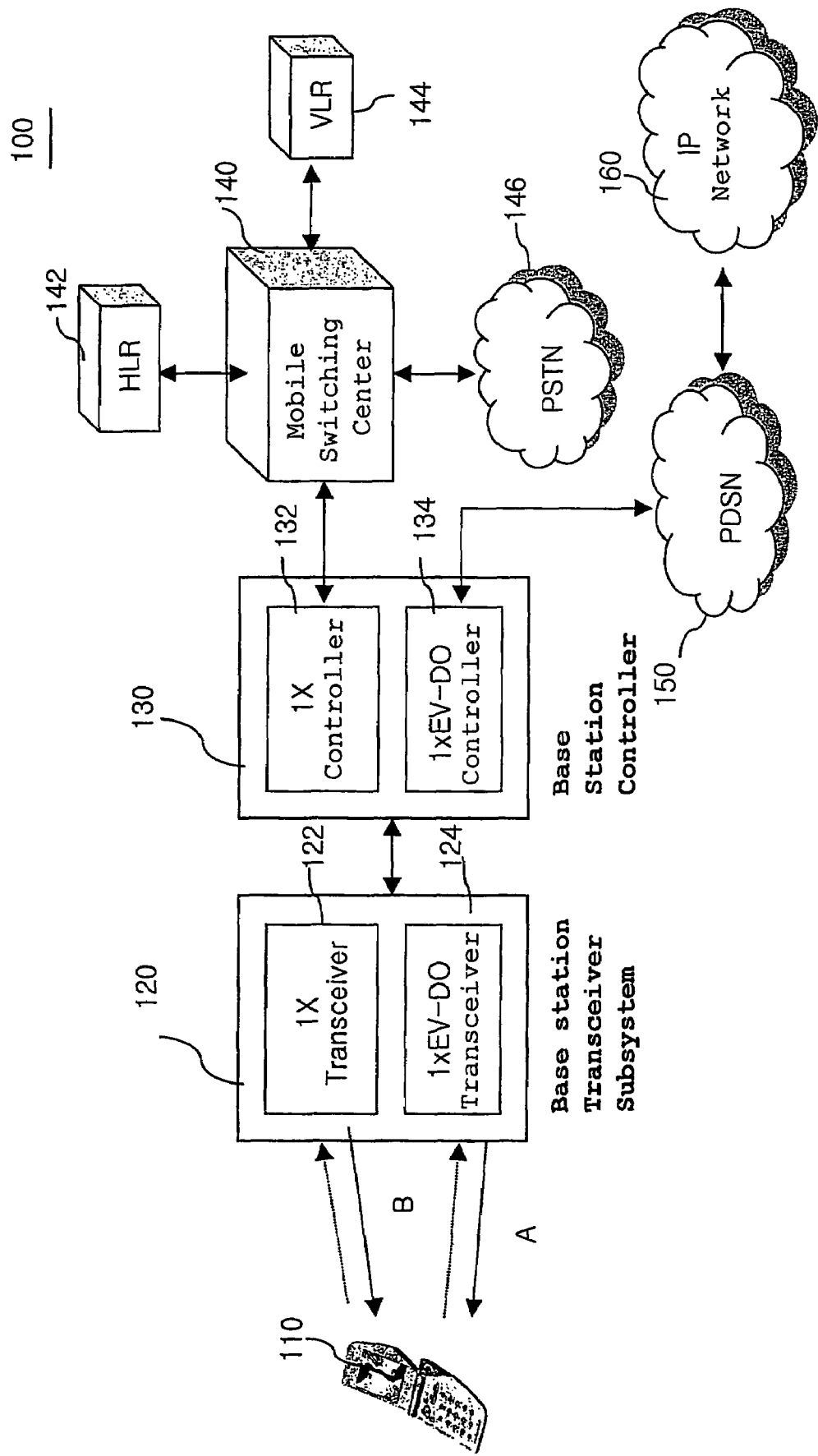
FIG. 1 is a schematic block view showing a system notifying a 1xEV-DO system of switching from a 1xEV-DO mode to a 1X mode when a hybrid access terminal is switched into the 1X mode according to an exemplary embodiment of the present invention.

FIG. 1 is a schematic block view showing. a system 100 notifying a 1xEV-DO system of switching from the 1xEV-DO system to a 1X system when a hybrid access terminal 110 is switched into the 1X system according to an exemplary embodiment of the present invention.

As shown in FIG. 1, the system 100 of the present invention includes both 1xEV-DO system and 1X system. That is, the system 100 has the 1X system making communication with a hybrid access terminal 110 and consisting of a 1X transceiver 122, a 1X controller 132, and a mobile switching center (MSC) 140 in order to transmit voice and data. In addition, the system 100 has the 1xEV-DO system making communication with the hybrid access terminal 110 and consisting of a 1xEV-DO access network transceiver subsystem (ANTS) 124, a 1xEV-DO access network controller (ANC) 134, a packet data serving node (hereinafter, simply referred to as PDSN) 150, and an IP (internet protocol) network 160 in order to transmit data only.

The hybrid access terminal 110 is divided into two parts so that the hybrid access terminal 110 can receive a voice service and a low-rate data service from the 1X system and receive a high-rate data service from the 1xEV-DO system, separately. The hybrid access terminal 110 is switched into a 1X mode when the hybrid access terminal 110 is in an idle state in such a manner that the hybrid access terminal 110 can make communication with the 1X system. In this state, the hybrid access terminal 110 is periodically switched into a 1xEV-DO mode in a predetermined period of time so as to check whether or not data are received through the 1xEV-DO system and returns to the 1X mode. According to the exemplary embodiment of the present invention, the hybrid access terminal 110 in traffic with the 1xEV-DO system is switched into the 1X mode (which is called "switch") and is again switched into the 1xEV-DO mode (which is called "return').

The switch and return functions operating between the 1xEV-DO system and the 1X system are controlled by means of software stored in a mobile station modem (MSM) chip, which is a kind of a baseband modem chip accommodated in the hybrid access terminal 110. In addition, the switch and return functions are achieved by tracking frequencies of each network using a searcher connected to the MSM chip. That is, when the hybrid access terminal 110 is switched from the 1xEV-DO mode into the 1X mode, a searcher module tracks the frequency of the 1X system under the control of the MSM chip. In addition, when the hybrid access terminal 110 returns to the 1xEV-DO mode from the 1X mode, the searcher module tracks the frequency of the 1xEV-DO system.

When the hybrid access terminal 110 receives data from the 1xEV-DO system in the 1xEV-DO mode, a great amount of data may be received in the hybrid access terminal 110 since the hybrid access terminal 110 receives high-rate data in the 1xEV-DO mode. Accordingly, in a case of a forward link for transmitting data from an access network (AN) to the hybrid access terminal 110, channels divided through a CDMA (code division multiple access) method may transmit data through time slots, which are divided through a TDM (time division multiplexing) method. In contrast, in a case of a reverse link for transmitting data from the hybrid access terminal 110 to the 1xEV-DO access network transceiver subsystem 124 and the 1xEV-DO access network controller 134, data are transmitted through a conventional CDMA method for a plurality of subscribers.

In addition, the hybrid access terminal 110 receiving data in traffic with the 1xEV-DO mode is periodically switched into the 1X mode in a predetermined period of time so as to check whether or not signals, such as voice signals, are received through the 1X system and returns to the 1xEV-DO mode.

The 1X transceiver 122 and the 1xEV-DO access network transceiver subsystem 124 form a base station transceiver subsystem (BTS) 120 so as to provide mobile communication services including voice and data to the hybrid access terminal 110 through an air interface. That is, the base station transceiver subsystem 120 transmits voice or data to the hybrid access terminal 110 through the 1X transceiver 122 and transmits only packet data to the hybrid access terminal 110 through the 1xEV-DO access network transceiver subsystem 124.

The 1X controller 132 and the 1xEV-DO access network controller 134 form a base station controller (BSC) 130 for controlling an operation of the base station transceiver subsystem 120. That is, the 1X controller 132 for controlling transmission of voice or data sends voice and/or data transmitted from the 1X transceiver 122 to the mobile switching center 140 and the 1xEV-DO access network controller 134 sends data transmitted from the 1xEV-DO access network transceiver subsystem 124 to the PDSN 150.

The mobile switching center 140 physically connects a plurality of 1X controllers 132 to another mobile switching center or to a public switched telephone network (PSTN) 146 so as to provide a communication access route of the 1X system with respect to a communication call transmitted from the hybrid access terminal 110 by switching the communication access route.

In addition, the mobile switching center 140 processes call signals of subscribers by obtaining profile information of the hybrid access terminal 110 from a home location register (hereinafter, simply referred to as "HLR") 132, which is a database storing information of hybrid access terminals registered in the mobile switching center 140, and a visitor location register (hereinafter, simply referred to as "VLR") 134, which is a database storing information of hybrid access terminals 110 located in a region of the mobile switching center 140. Herein, profile information includes a mobile identification numbers (MIN), an electrical serial number (ESN), and supplementary services.

The 1xEV-DO system, which is a high-rate packet data system, is connected to the PDSN 150 based on TCP/IP so as to transmit/receive various data in the form of IP packets to/from the IP network 160. In addition, the 1xEV-DO system receives packet data from the IP network 160 and transmits the packet data to the hybrid access terminal 110 through time slots, which are divided through a TDM method. In addition, the 1xEV-DO system receives CDMA data, which are modulated through a CDMA method, from the hybrid access terminal 110, creates packet data by using the CDMA data, and transmits the packet data to the PDSN 150.

In a case of a forward link, the 1xEV-DO system transmits data with maximum power thereof without using a power control of a wireless base station while providing only a hard handoff function. However, in a case of a reverse link, the power control is carried out in each terminal while providing a soft handoff function as well as the hard handoff function.

In addition, according to the present invention, when the hybrid access terminal 110 operated in the 1xEV-DO mode in traffic with the 1xEV-DO system is switched into the 1X mode, the hybrid access terminal 110 notifies the 1xEV-DO system of switching from the 1xEV-DO mode into the 1X mode through a data rate control (DRC) channel by using signals having DRC cover values (for example, 0, 1, 2 . . . ). Herein, the DRC channel exists in the reverse link for transmitting signals or data from the hybrid access terminal 110 to the 1xEV-DO system, which will be described in detail with reference to FIG. 3.

Accordingly, since the 1xEV-DO system receives the "switch" of the hybrid access terminal 110 into the 1X system from the hybrid access terminal 110 through the DRC channel, the 1xEV-DO system may recognize that the hybrid terminal 110 is operated under the 1X mode. Even if the call drop of the hybrid access terminal 110 occurs after a predetermined period of time lapses, the 1xEV-DO system can recognize that the hybrid terminal 110, which is subject to the call drop, operates in the 1X mode. Of course, the DRC cover value representing the switch of the hybrid access terminal 110 into the 1X mode is predetermined between the 1xEV-DO system and the hybrid access terminal 110.

Figure 2A:
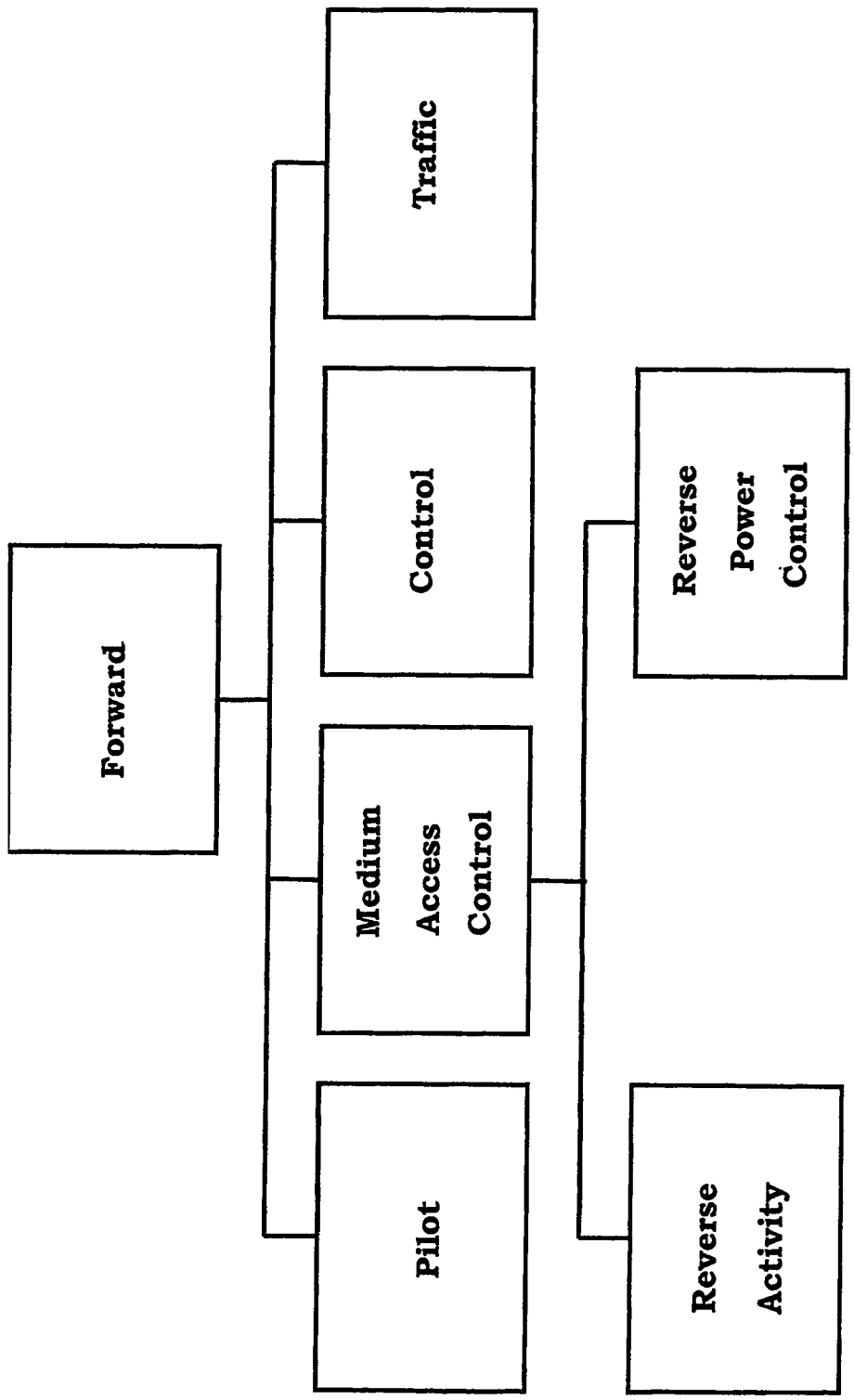
FIGS. 2A and 2B are block views showing a channel structure of a forward link for transmitting data to a hybrid access terminal through a 1xEV-DO system.
Figure 2B:
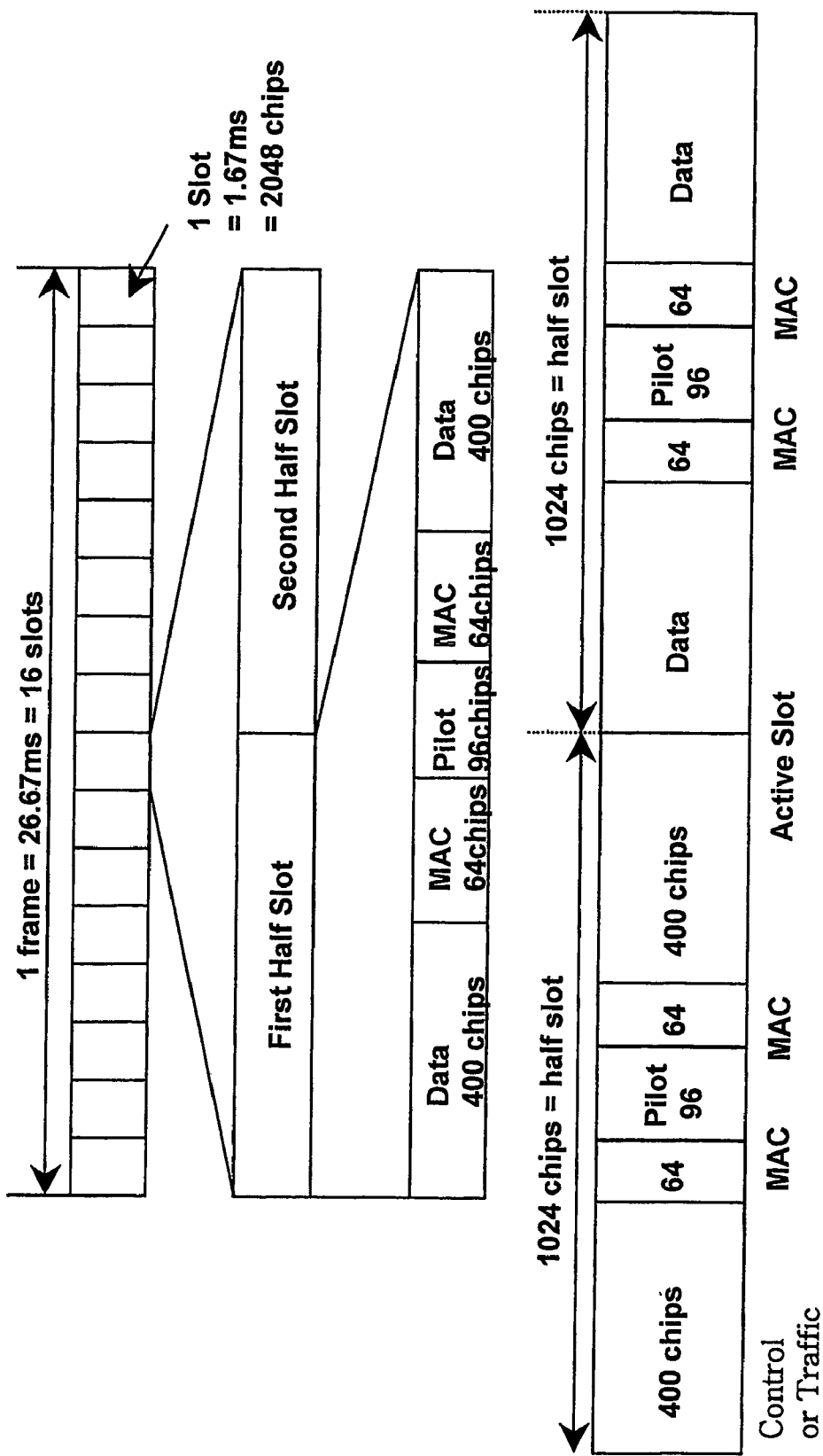

FIGS. 2A and 2B are block views showing a channel structure of a forward link for transmitting data to the hybrid access terminal 110 through the 1xEV-DO system.

As shown in FIG. 2A, the forward link includes a pilot channel, a medium access control (MAC) channel, a control channel, and a traffic channel. The pilot channel is provided to transmit a pilot signal for allowing the 1xEV-DO system to track the hybrid access terminal 110. The hybrid access terminal 110 receives at least one pilot signal through the pilot channel and accesses to a wireless base station, which has transmitted a pilot signal having greatest intensity. In addition, the pilot channel is used as a reference for coherent detection of the wireless base station having the 1xEV-DO system by means of the hybrid access terminal 110.

The MAC channel is mainly used for controlling the reverse link and includes a reverse activity (RA) channel and a reverse power control (RPC) channel. Herein, the RA channel is used for determining a transmission rate of the reverse link. In addition, the RA channel may be used for requesting the hybrid access terminal 110 to decrease the transmission rate when channels of the reverse link are saturated. In addition, the RPC channel is used for controlling transmission power when the hybrid access terminal 110 transmits signals or data through the reverse link.

The control channel is used for transmitting a broadcast message or a direct message for directly controlling a specific hybrid access terminal from the 1xEV-DO system to the hybrid access terminal 110. The traffic channel is used when the 1xEV-DO system transmits only packet data to the hybrid access terminal 110.

Hereinafter, a time slot structure and a data structure in the forward link will be described with reference to FIG. 2B. Firstly, the forward link includes 16 time slots per one frame having a time interval about 26.67 ms. In addition, each of the time slots includes a first half slot having 1024 chips and a second half slot having 1024 chips, that is, the time slot has total 2048 chips. In addition, a time interval of 1.67 ms is allotted to each time slot.

In detail, each of the first half slot and second half slot includes 400 data slot chips, 64 MAC slot chips, 96 pilot slot chips, 64 MAC slot chips and 400 data slot chips.

Figure 3:
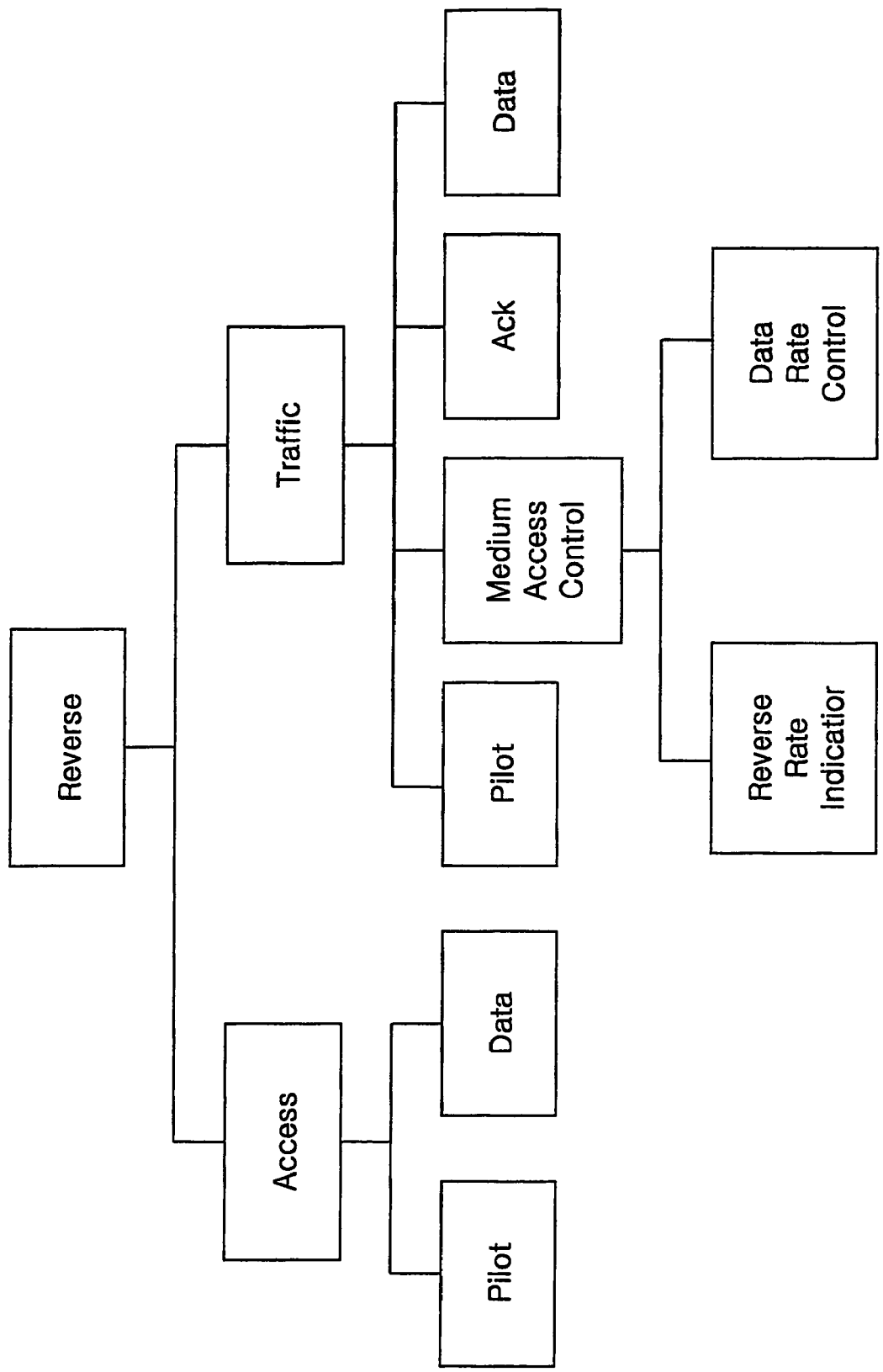
FIG. 3 is a block view showing a channel structure of a reverse link for transmitting data to a 1xEV-DO system from a hybrid access terminal.

FIG. 3 is a block view showing a channel structure of the reverse link for transmitting data to the 1xEV-DO system from the hybrid access terminal 110.

The reverse link shown in FIG. 3 may use a CDMA method in the same manner as the 1X system and mainly include an access channel and a traffic channel. The access channel has a pilot channel and a data channel and the traffic channel has a pilot channel, a MAC channel, an Ack channel, and a data channel. Herein, the MAC channel is again divided into a reverse rate indicator (RRI) channel and a data rate control (DRC) channel.

The access channel is used for transmitting an origination signal (connection_request message), and a registration signal (route_update message). The access channel has a low transmission rate of 9.6 kbps for stability of a wireless channel.

Similar to the pilot channel in the forward link shown in FIG. 2A, the pilot channel shown in FIG. 3 is used as a reference for coherent detection of the wireless base station having the 1xEV-DO system by means of the hybrid access terminal 110. The data channel is used for transmitting data required for the hybrid access terminal 110 to access to the 1xEV-DO system.

The traffic channel is used when the hybrid access terminal 110 transmits packet data to the 1xEV-DO system. The traffic channel provides various data transmission rates depending on the wireless communication environment.

The pilot channel performs a function identical to the function of the pilot channel, which has been described with reference to the access channel. The MAC channel is used for controlling a data transmission rate of the traffic channel, so the MAC channel continuously exists while the hybrid access terminal 110 is being connected to the 1xEV-DO system. The RRI channel of the MAC channel is used for representing information of the data transmission rate of the traffic channel when the hybrid access terminal 110 transmits data through the traffic channel. An RRI value is displayed in the hybrid access terminal 110.

In addition, the DRC channel determines a data rate, which can be demodulated, depending on the channel environment of the forward link and notifies the base station of the data rate. That is, the 1xEV-DO access network transceiver subsystem 124 transmits packet data to the hybrid access terminal 110 by using time slots of the forward link. At this time, a basis for determining the transmission rate of packet data is the DRC cover value transmitted by the hybrid access terminal 110. In order to determine the DRC cover value, the hybrid access terminal 110 measures a C/I (carrier to interference) value transmitted from the 1xEV-DO access network transceiver subsystem 124 and determines the DCR cover value for the maximum transmission rate.

According to the exemplary embodiment of the present invention, the DRC cover values representing the switch of the hybrid access terminal 110 into the 1X system are predetermined between the hybrid access terminal 110 and the 1xEV-DO system. For instance, if the DRC cover value representing the switch of the hybrid access terminal 110 from the 1xEV-DO mode into the 1X mode is predetermined as "1", the hybrid access terminal 110 is switched into the 1X mode after transmitting the DRC value "1" into the 1xEV-DO system through the DRC channel. Accordingly, the 1xEV-DO system can recognize the switch of the hybrid access terminal 110 into the 1X mode by demodulating the DRC cover value transmitted from the hybrid access terminal 110. To this end, DRC cover values representing the switch of the hybrid access terminal 110 into the 1X mode must be predetermined between the hybrid access terminal 110 and the 1xEV-DO system. In addition, the hybrid access terminal 110 and the 1xEV-DO system must store the DRC cover values therein, respectively.

Figure 4:
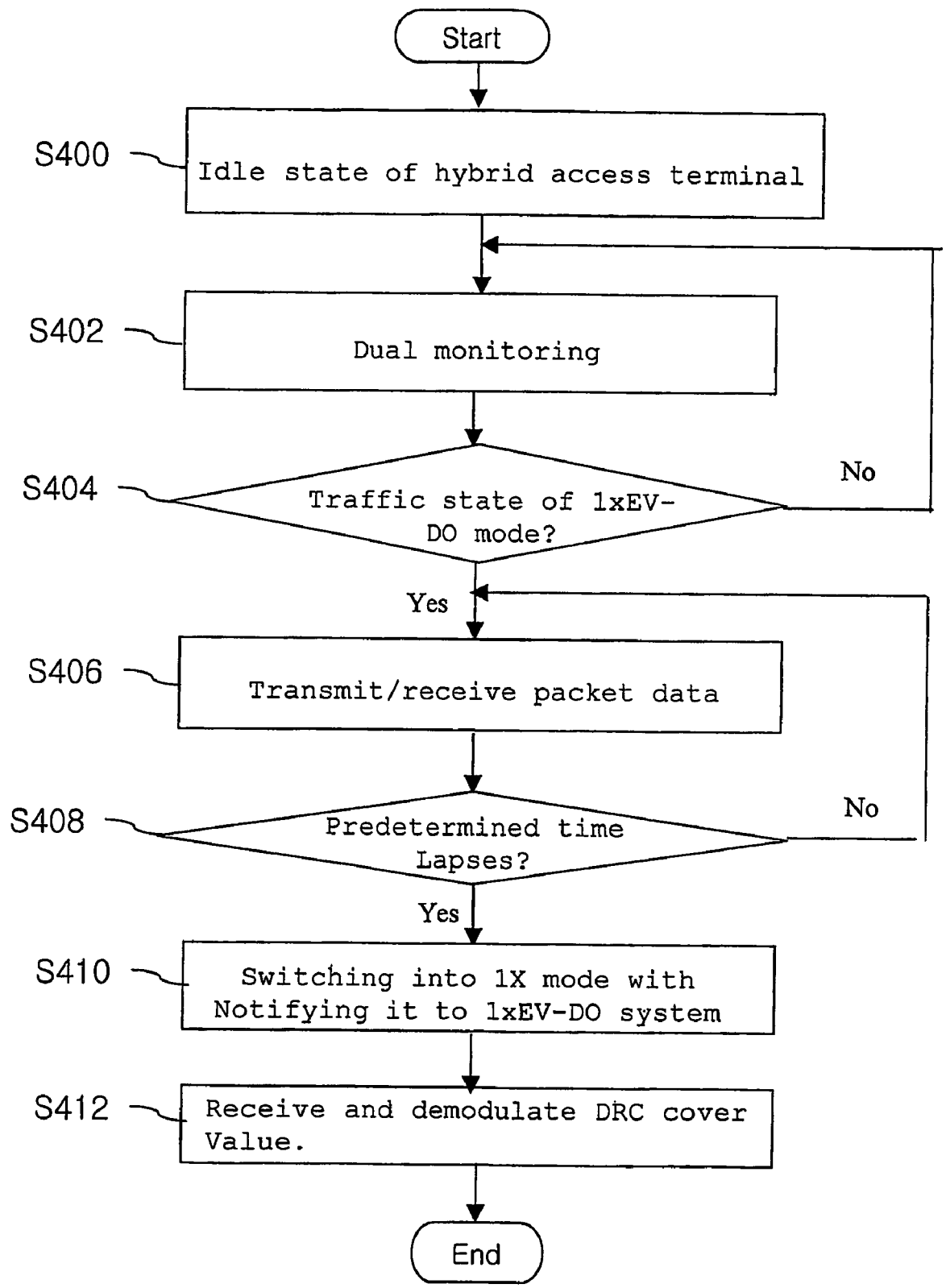
FIG. 4 is a flowchart showing a procedure for notifying a 1xEV-DO system of switching from the 1xEV-DO system to a 1X system when a hybrid access terminal is switched into the 1X system according to an exemplary embodiment of the present invention.

FIG. 4 is a flowchart showing a procedure for notifying the 1xEV-DO system of switching from the 1xEV-DO system to the 1X system when the hybrid access terminal 110 is switched into the 1X mode according to an exemplary embodiment of the present invention.

When the hybrid access terminal 110 is powered on by a user, the hybrid access terminal 110 receives the pilot signals from the 1X controller 132 and the 1X transceiver 122 of the 1X system so that the 1X mode is initialized and the hybrid access terminal 110 is maintained in an idle state. In addition, the hybrid access terminal 110 initializes the 1xEV-DO mode by using a system parameter message obtained when initializing the 1X mode, and the pilot signals transmitted from the 1xEV-DO access network controller 134 and the 1xEV-DO access network transceiver subsystem 124, and then, the hybrid access terminal 110 is maintained in the idle state (S400).

After initializing the 1X mode and the 1xEV-DO mode, the hybrid access terminal 110 performs a dual monitoring between the 1X mode and the 1xEV-DO mode (S402).

In addition, the hybrid access terminal 110 monitors the 1X system and the 1xEV-DO system in the idle state. In this state, if data are transmitted to the hybrid access terminal 110 from the 1xEV-DO access network transceiver subsystem 124 or the user requests data to the 1xEV-DO system by operating key buttons of the hybrid access terminal 110, it is checked whether or not the 1xEV-DO mode is activated and the hybrid access terminal 110 is entered into a traffic state for receiving/transmitting data (S404). In order to allow the hybrid access terminal 110 to enter into the traffic state, a connection and a session may be formed between the hybrid access terminal 110 and the 1xEV-DO access network transceiver subsystem 124 in such a manner that the hybrid access terminal 110 may transmit/receive data to/from the 1xEV-DO access network transceiver subsystem 124.

If the hybrid access terminal 110 enters into the traffic state of the 1xEV-DO mode in step S404, the hybrid access terminal 110 transmits/receives packet data to/from the 1xEV-DO system (S406).

While transmitting/receiving packet data into/from the 1xEV-DO system in the traffic state, the hybrid access terminal 110 checks whether or not a predetermined time (for example, 5.12 seconds) lapses by using a timer accommodated in the hybrid access terminal 110 in order to periodically search the 1X system (S408).

If it is determined that the predetermined time lapses in step 408, the hybrid access terminal 110 transmits a signal including the DRC cover value, which notifies that the hybrid access terminal 110 is switched into the 1X system, to the 1xEV-DO system through the DRC channel of the reverse link and is switched into the 1X system (S410).

Accordingly, the 1xEV-DO access network controller 134 may recognize the switch of the hybrid access terminal 110 into the 1X mode by receiving and demodulating the signal including the DRC cover value transmitted from the DRC channel of the reverse link (S412).

According to the present invention, the 1xEV-DO system can check whether or not the hybrid access terminal 110 in traffic with the 1xEV-DO system is switched into the 1X mode in real time, so the reason of the call drop can be instantly found if the call drop of the hybrid access terminal 110 occurs while the hybrid access terminal 110 is being switched into the 1X mode.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICATION

As can be seen from the foregoing, different from the conventional 1xEV-DO system, which performs the call drop operation with respect to the hybrid access terminal without recognizing the reason of the call drop operation, the present invention notifies the 1xEV-DO system of switching from the 1xEV-DO mode into the 1X mode when the hybrid access terminal is switched into the 1X mode, so the reason of the call drop of the hybrid access terminal can be instantly found when the call drop of the hybrid access terminal occurs while the hybrid access terminal is being switched into the 1X mode.

In addition, according to the present invention, the hybrid access terminal notifies the 1xEV-DO system of switching from the 1xEV-DO mode into the 1X mode by using the reverse channel in such a manner that the 1xEV-DO system can recognize the reason of the call drop of the hybrid access terminal, so it is not required to additionally use system resources of the 1xEV-DO system, thereby preventing the 1xEV-DO system from being subject to overload.

What is claimed:

1. A system for notifying a CDMA 2000 1xEV-DO system of switching from a 1xEV-DO mode into a 1X mode when a hybrid access terminal is switched into the 1X mode, the system comprising:
   the hybrid access terminal operated in the 1X mode in relation to a 1X system for receiving a voice signal transmission service or a low-rate data transmission service from the 1X system and in the 1xEV-DO mode in relation to the 1xEV-DO system for receiving a high-rate data transmission service from the 1xEV-DO system, the hybrid access terminal in traffic with the 1xEV-DO system being periodically switched into the 1X mode in order to update an overhead message while transmitting a predetermined signal notifying the 1xEV-DO system of switching of the hybrid access terminal from the 1xEV-DO mode into the 1X mode;
   a base station transceiver subsystem including a 1x EV-DO access network transceiver for transmitting/receiving packet data to/from the hybrid access terminal and a 1X transceiver for transmitting/receiving voice or data to/from the hybrid access terminal;
   a base station controller including a 1xEV-DO access network controller for controlling a packet data transmission service of the 1xEV-DO access network transceiver and a 1X controller for controlling a transmission service of the 1X transceiver; and
   a packet data serving node (PDSN) connected to the 1xEV-DO access network controller so as to transmit/receive the packet data to/from the 1xEV-DO system.

2. The system as claimed in claim 1, wherein the hybrid access terminal is switched to the 1X mode in an idle state thereof in order to make communication with the 1X system, is periodically switched into the 1xEV-DO mode in a predetermined period of time so as to check whether or not data are received through the 1xEV-DO system, and then returns to the 1X mode.

3. The system as claimed in claim 1, wherein the hybrid access terminal receiving high-rate data from the 1xEV-DO system in the 1xEV-DO mode is periodically switched into the 1X mode in a predetermined period of time so as to check whether or not signals are received through the 1X system, and then returns to the 1xEV-DO mode.

4. The system as claimed in claim 1, wherein a TDMA (time division multiple access) method is utilized in a case of a forward link transmitting data from the 1xEV-DO system to the hybrid access terminal, and a CDMA (code division multiple access) method is utilized in a case of a reverse link transmitting data from the hybrid access terminal to the 1xEV-DO system.

5. The system as claimed in claim 4, wherein a hard handoff is carried out in case of the forward link by transmitting data with maximum power without performing power control, and a soft handoff is carried out in case of the reverse link while performing the power control with respect to each hybrid access terminal.

6. The system as claimed in claim 1, wherein the hybrid access terminal is switched from the 1xEV-DO mode into the 1X mode by tracking frequency of the 1X system using a searcher module under the control of a mobile station modem (MSM) chip.

7. The system as claimed in claim 4, wherein the forward link includes a pilot channel used for transmitting a pilot signal allowing the 1xEV-DO system to track the hybrid access terminal, a MAC (medium access control) channel used for controlling the reverse link, a control channel used for transmitting a broadcast message or a direct message for directly controlling a specific hybrid access terminal from the 1xEV-DO system to the hybrid access terminal, and a traffic channel used for transmitting only packet data from the 1xEV-DO system to the hybrid access terminal.

8. The system as claimed in claim 1, further comprising a mobile switching center for providing a communication access route of the 1X system with respect to a communication call transmitted from the hybrid access terminal by switching the communication access route.

9. A method for notifying a CDMA 2000 1xEV-DO system of switching from a 1xEV-DO mode into a 1X mode when a hybrid access terminal is switched into the 1X mode, the method comprising the steps of:
   (a) sequentially initializing the 1X mode and the 1x EV-DO mode of the hybrid access terminal such that the hybrid access terminal stays in an idle state;
   (b) performing dual monitoring with respect to the 1X mode and the 1xEV-DO mode by using the hybrid access terminal in a state that the hybrid access terminal stays in the idle state;
   (c) allowing the hybrid access terminal to enter into a traffic state of the 1xEV-DO mode such that a connection and a session are formed between the hybrid access terminal and the 1xEV-DO system, thereby enabling the hybrid access terminal to transmit/receive packet data to/from the 1xEV-DO system;
   (d) switching the hybrid access terminal into the 1X mode after transmitting a predetermined signal to the 1x EV-DO system when a predetermined monitoring time lapses; and
   (e) demodulating the predetermined signal received in the 1xEV-DO system to determine the switching of the hybrid access terminal into the 1X mode.

10. The method as claimed in claim 9, wherein, in step (a), the hybrid access terminal initializes the 1xEV-DO mode by using system parameters obtained when initializing the 1X mode.

11. The method as claimed in claim 9, wherein, in step (d), the switching operation is carried out by means of a searcher module which tracks frequency of the 1X system under the control of a mobile station modem (MSM) chip.

12. The method as claimed in claim 9, wherein, in step (d), the monitoring time is a connection time of the hybrid access terminal to the 1xEV-DO system until the hybrid access terminal is switched into the 1X mode.

13. The method as claimed in claim 12, wherein the monitoring time is 5.12 seconds.

14. The method as claimed in claim 9, wherein, in step (d), the hybrid access terminal transmits the predetermine signal through a data rate control (DRC) channel of a reverse link.

15. The method as claimed in claim 14, wherein the predetermine signal includes information about a DRC cover value, which is determined in advance and notifies that the hybrid access terminal is switched into the 1X mode.

16. The method as claimed in claim 9, wherein, in step (e), the 1xEV-DO system performs a call drop operation for the hybrid access terminal when the hybrid access terminal switched into the 1X mode represents no response to a call signal of the 1xEV-DO system within a predetermined time.

17. The method as claimed in claim 9, wherein, in step (e), the 1xEV-DO system determines that a call drop of the hybrid access terminal occurs due to the switch of the hybrid access terminal into the 1X mode, if the hybrid access terminal switched into the 1X mode represents no response to a call signal of the 1xEV-DO system within a predetermined time.

18. The method as claimed in claim 15 or 17, wherein the 1xEV-DO system determines the switch of the hybrid access terminal into the 1X mode by checking the DRC cover value through demodulating the predetermined signal received in the 1xEV-DO system.

19. The method as claimed in claim 16 or 17, wherein the predetermined time is defined in a standard of the 1x EV-DO system as 5.12 seconds.

20. A hybrid access terminal capable of preventing a call drop thereof with respect to a 1xEV-DO system by notifying the 1xEV-DO system of switching of the hybrid access terminal from a 1xEV-DO mode into a 1X mode, the hybrid access terminal comprising:
a timer repeatedly measuring a monitoring time in order to perform dual monitoring between the 1xEV-DO system and a 1X system;
a searcher module for tracking and converting frequency so as to detect the switching of the hybrid access terminal between the 1X mode and the 1xEV-DO mode, and receiving an overhead message;
a finger module for demodulating the overhead message received in the searcher module; and
a mobile station modem (MSM) chip alternately and periodically searching the 1xEV-DO system and the 1X system, creating a predetermined signal notifying the switching of the hybrid access terminal from the 1xEV-DO mode into the 1X mode when the hybrid access terminal is switched into the 1X mode, and transmitting the predetermined signal to the 1x EV-DO system through the searcher module.

21. The hybrid access terminal as claimed in claim 20, wherein the hybrid access terminal searches frequencies used in the 1X system or 1xEV-DO system according to a predetermined monitoring period so as to be operated in the 1X mode or 1xEV-DO mode.

22. The hybrid access terminal as claimed in claim 20, wherein the predetermined signal includes a DRC cover value, which is predetermined between the 1xEV-DO system and the hybrid access terminal, notifying a switch of the hybrid access terminal into the 1X mode.

23. The hybrid access terminal as claimed in claim 20, wherein the hybrid access terminal transmits the predetermine signal to the 1xEV-DO system through a data rate control (DRC) channel.

* * * * *